United States Patent
Kajioka (10) Patent No.: US 11,953,652 B2
(45) Date of Patent: Apr. 9, 2024

(54) ARTICLE WITH ANTI-GLARE SURFACE

(71) Applicant: NIPPON ELECTRIC GLASS CO., LTD., Shiga (JP)

(72) Inventor: Toshiyuki Kajioka, Otsu (JP)

(73) Assignee: Nippon Electric Glass Co., Ltd., Shiga (JP)

(*) Notice: Subject to any disclaimer, the term of this patent is extended or adjusted under 35 U.S.C. 154(b) by 801 days.

(21) Appl. No.: 17/044,113

(22) PCT Filed: Apr. 2, 2019

(86) PCT No.: PCT/JP2019/014616
§ 371 (c)(1),
(2) Date: Sep. 30, 2020

(87) PCT Pub. No.: WO2019/194176
PCT Pub. Date: Oct. 10, 2019

(65) Prior Publication Data
US 2021/0116607 A1 Apr. 22, 2021

(30) Foreign Application Priority Data
Apr. 4, 2018 (JP) .................. 2018-072662

(51) Int. Cl.
*G02B 1/115* (2015.01)
*G02B 1/18* (2015.01)

(52) U.S. Cl.
CPC ............... *G02B 1/115* (2013.01); *G02B 1/18* (2015.01)

(58) Field of Classification Search
CPC .................. G02B 1/115; G02B 1/18

USPC .......................................... 359/359
See application file for complete search history.

(56) References Cited

U.S. PATENT DOCUMENTS

| | | | |
|---|---|---|---|
| 8,598,771 B2 | 12/2013 | Carlson et al. | |
| 9,734,590 B2 | 8/2017 | Prakash | |
| 9,766,376 B2 * | 9/2017 | Ho ......................... | G02B 1/115 |
| 2007/0217015 A1 | 9/2007 | Furuya et al. | |
| 2011/0062849 A1 | 3/2011 | Carlson et al. | |

(Continued)

FOREIGN PATENT DOCUMENTS

| | | |
|---|---|---|
| CN | 103502166 A | 1/2014 |
| CN | 104834034 A | 8/2015 |

(Continued)

OTHER PUBLICATIONS

Akagaki,T. et al., "Effects of PEEK's surface roughness in seizure behaviors of PEEK/steel pairs under oil-lubricated sliding contacts", Mechanical Engineering Journal, vol. 4, No. 5, , pp. 1-10, (2017), 10 pages.

(Continued)

*Primary Examiner* — Jerry L Brooks
(74) *Attorney, Agent, or Firm* — Cesari and McKenna, LLP (57) ABSTRACT

Disclosed is an article that includes an antiglare surface. When measuring surface shapes of six adjacent areas obtained by dividing the antiglare surface into dimensions of 103 μm×118 μm, the antiglare surface includes a surface shape such that an average value of an arithmetic mean height Sa of the six areas is 20 nm or greater and a variation coefficient CV1, which is obtained from the average value and a standard deviation of the arithmetic mean height Sa of the six areas, is 0.020 or greater.

6 Claims, 3 Drawing Sheets

(56) References Cited

U.S. PATENT DOCUMENTS

| | | |
|---|---|---|
| 2012/0218640 A1 | 8/2012 | Gollier et al. |
| 2013/0107370 A1 | 5/2013 | Lander |
| 2015/0168610 A1 | 6/2015 | Fukui |
| 2016/0326047 A1 | 11/2016 | Mototani |
| 2017/0176254 A1 | 6/2017 | Ehbets |
| 2017/0285227 A1 | 10/2017 | Chen et al. |
| 2017/0327418 A1 | 11/2017 | Gollier et al. |
| 2018/0038995 A1 | 2/2018 | Fujii |
| 2018/0099307 A1 | 4/2018 | Takeda |
| 2018/0170800 A1 | 6/2018 | Inamoto et al. |
| 2018/0335659 A1 | 11/2018 | Takeda et al. |
| 2019/0248703 A1 | 8/2019 | Gollier et al. |
| 2019/0391303 A1 | 12/2019 | Ikegami et al. |
| 2020/0180210 A1 | 6/2020 | Kajioka |
| 2020/0191999 A1 | 6/2020 | Kajioka et al. |
| 2020/0197978 A1 | 6/2020 | Kajioka et al. |
| 2022/0043184 A1 | 2/2022 | Saitoh |

FOREIGN PATENT DOCUMENTS

| | | |
|---|---|---|
| CN | 105319616 A | 2/2016 |
| DE | 112014000995 T5 | 11/2015 |
| EP | 3505979 A1 | 3/2019 |
| JP | 10221506 A | 8/1998 |
| JP | 2002/189107 A | 7/2002 |
| JP | 2003/222713 A | 8/2003 |
| JP | 200741514 A | 2/2007 |
| JP | 2007/187952 A | 7/2007 |
| JP | 2010/064932 A | 3/2010 |
| JP | 2011/047982 A | 3/2011 |
| JP | 2012/051175 A | 3/2012 |
| JP | 201293570 A | 5/2012 |
| JP | 2013/504514 A | 2/2013 |
| JP | 201459334 A | 4/2014 |
| JP | 2014/513029 A | 5/2014 |
| JP | 2015/196303 A | 11/2015 |
| JP | 5839134 B2 | 1/2016 |
| JP | 2016/018068 A | 2/2016 |
| JP | 2016/6013378 B2 | 10/2016 |
| JP | 2017/538150 A | 12/2017 |
| JP | 2018-063419 A | 4/2018 |
| JP | 2018/077279 A | 5/2018 |
| JP | 2018-198050 A | 12/2018 |
| TW | 2017/010064 A | 3/2017 |
| WO | 2003/060573 A2 | 7/2003 |
| WO | 2012118594 A1 | 9/2012 |
| WO | 2014/119453 A1 | 8/2014 |
| WO | 2015/137196 A1 | 9/2015 |
| WO | 2015163328 A1 | 10/2015 |
| WO | 2016/068112 A1 | 5/2016 |
| WO | 2016/069113 A1 | 5/2016 |
| WO | 2016/181983 A1 | 11/2016 |

OTHER PUBLICATIONS

Liosi, A.I. "Development of a Simulation Tool for the Lubrication between the Piston Rings and the Cylinder Bore of an Internal Combustion Engine", Diploma Thesis, National Technical University of Athens, School of Mechanical Engineering Fluids Department, Parallel CFD & Optimization Unit, (2021), 125 pages.

Notice of Dispatch of Duplicates of a Written Opposition, mailed Feb. 17, 2023, Japanese Patent No. 7120241, 29 pages.

Reynaud, C. et al., "Quantitative determination of Young's modulus on a biphase polymer system using atomic force microscopy", Surf. Interface Anal. 30, pp. 185-189, (2000), 6 pages.

Takatou, H., et al. "Analysis of Steel Plate Surface Roughness", Journal of the Society of Instrument and Control Engineers, vol. 14, No. 10, pp. 757-765 (1975), 10 pages.

Cohen et al, "Surface Roughness and Texture: Considerations when Making the Change from R Parameters to S Parameters," Finishing & Coating website, Mar. 9, 2021, available at https://finishingandcoating.com/index.php/plating/567-surface-roughness-and-texture-considerations-when-making-the-change-from-rparameters-to-s-parameters, 12 pages.

Klapetek et al., "Gwyddion User Guide," 2012, 11 pages.

\* cited by examiner

ARTICLE WITH ANTI-GLARE SURFACE

TECHNICAL FIELD

The present invention relates to an article with an antiglare surface.

BACKGROUND ART

A known technique improves visual recognition of a displayed image by, for example, using an antiglare surface to form a main surface, which is a visual recognition side, of a transparent article for a display device. Patent Document 1 discloses a technique in which sparkle (dazzle resulting from sparkle effect) is reduced by setting a surface roughness (RMS surface roughness) of a transparent glass panel in a certain range.

PRIOR ART LITERATURE

Patent Literature

Patent Document 1: International Publication No. 2012/118594

SUMMARY OF THE INVENTION

Problem to be Solved by the Invention

With regard to an article including an antiglare surface such as that described above, there is still room for improvement in terms of reducing background reflection.

One object of the present invention is to provide an article including an antiglare surface that reduces background reflection.

Means for Solving the Problem

An article that solves the above problem includes an antiglare surface. When measuring surface shapes of six adjacent areas obtained by dividing the antiglare surface into dimensions of 103 μm×118 μm, the antiglare surface includes a surface shape such that an average value of an arithmetic mean height Sa of the six areas is 20 nm or greater and a variation coefficient CV1, which is obtained from the average value and a standard deviation of the arithmetic mean height Sa of the six areas, is 0.020 or greater.

Preferably, the article is light-transmissive. Further, it is preferred that when measuring surface shapes of twelve adjacent areas obtained by dividing the antiglare surface into dimensions of 64 μm×64 μm, the antiglare surface include a surface shape such that an average value of an arithmetic mean height Sa of the twelve areas is 20 nm or greater and a variation coefficient CV2, which is obtained from the average value and a standard deviation of the arithmetic mean height Sa of the twelve areas, is less than 0.090.

In the article, it is preferred that a ratio of the variation coefficient CV1 to the variation coefficient CV2 (ratio=CV1/CV2) be 0.200 or greater.

Preferably, the article includes a glass base material and an antiglare layer arranged on the glass base material.

In the article, an antireflection layer may further be arranged on the antiglare surface.

In the article, an antifouling layer may further be arranged on the antireflection layer.

Effect of the Invention

The present invention succeeds in reducing background reflection in the article including the antiglare surface.

MODE FOR CARRYING OUT THE INVENTION

One embodiment of an article including an antiglare surface will now be described with reference to the drawings. To facilitate understanding, configurations may be partially exaggerated in the drawings. Further, elements in the drawings may not be to scale.

Figure 1:
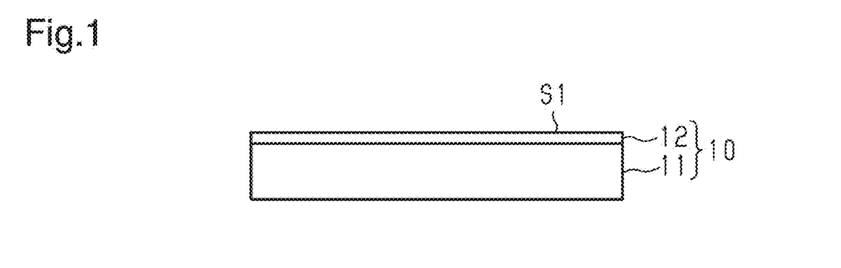
FIG. 1 is a schematic diagram of an article including an antiglare surface in accordance with one embodiment.

As shown in FIG. 1, an article 10 includes a base material 11 and an antiglare layer 12. The antiglare layer 12 is formed on one of two main surfaces of the base material 11. Examples of the material for the base material 11 include, for example, a glass and a resin. The glass may be, for example, known glass such as alkali-free glass, borosilicate glass, aluminosilicate glass, or soda lime glass. Further, a reinforced glass, such as a chemically reinforced glass, or a crystallized glass, such as LAS-type crystallized glass, may be used. Examples of the resin include, for example, an acrylic resin, such as polymethylmethacrylate, a polycarbonate resin, and an epoxy resin.

The base material 11 is preferably a glass base material. Further preferably, the base material 11 is a reinforced glass base material. Among reinforced glasses, a chemically reinforced glass is preferred. More preferably, the chemically reinforced glass has the glass composition of aluminosilicate glass. Preferably, the aluminosilicate glass includes 50% to 80% by mass of $SiO_2$, 5% to 25% by mass of $Al_2O_3$, 0% to 15% by mass of $B_2O_3$, 1% to 20% by mass of $Na_2O$, and 0% to 10% by mass of $K_2O$.

An example of the base material 11 is a base material plate that has a thickness in a range from 0.1 to 5 mm.

The antiglare layer 12 forms an antiglare surface S1 that has an uneven structure for scattering light. Preferably, the antiglare layer 12 is formed from at least one type of oxide selected from $SiO_2$, $Al_2O_3$, $ZrO_2$, and $TiO_2$. Preferably, the thickness of the antiglare layer 12 is, for example, in a range from 40 to 500 nm.

The article 10 may be non-light-transmissive or may be light-transmissive. When non-light-transmissive, the article 10 can be used for, for example, an ornamental component or a casing. When light-transmissive, the article 10 is preferable for use as, for example, a cover of a display device. A display device includes, for example, a light source and a liquid crystal display. The display device may include a touch panel function. Preferably, the article 10 that is light-transmissive has an average light transmissivity of, for example, 80% or greater for light having a wavelength of 400 nm or greater and 700 nm or less.

Figure 2:
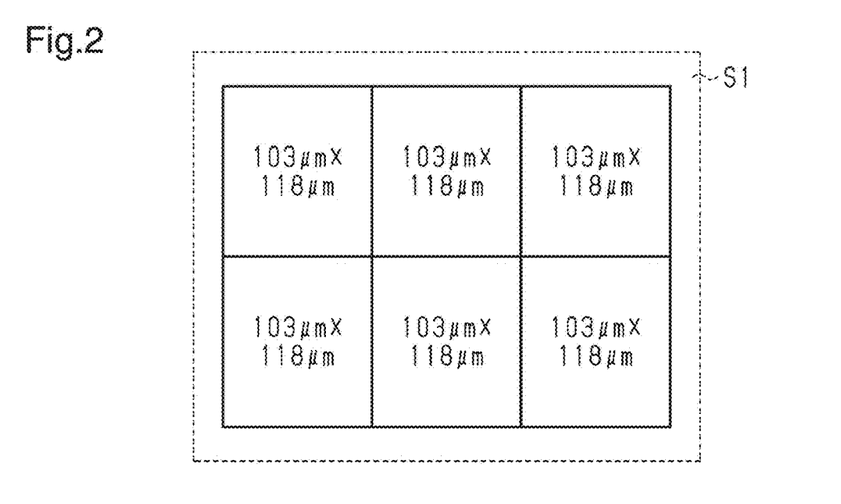
FIG. 2 is a diagram illustrating calculation of variation coefficient CV1.

As shown in FIG. 2, when measuring surface shapes of six adjacent areas obtained by dividing the antiglare surface S1 of the article 10 into dimensions of 103 µm×118 µm, an average value of the arithmetic mean height Sa of the six areas is 20 nm or greater, preferably 40 nm or greater, and further preferably 60 nm or greater. The arithmetic mean height Sa can be measured in accordance with ISO 25178.

When measuring the surface shapes of the six adjacent areas having the dimensions of 103 µm×118 µm in the antiglare surface S1, the surface shape of the antiglare surface S1 of the article 10 is such that variation coefficient CV1, which is obtained from the average value and the standard deviation of the arithmetic mean height Sa of the six areas, is 0.020 or greater.

When the average value of the arithmetic mean height Sa of the six areas is 20 nm or greater and the variation coefficient CV1, which is obtained from the arithmetic mean height Sa of the six areas, is 0.020 or greater, a certain regularity is reduced in the surface structure of the antiglare surface S1. The regularity would cause interference that intensifies reflected light components in a specular reflection direction. Thus, background reflection on the antiglare surface S1 of the article 10 is reduced.

Further, when measuring the surface shapes of the six adjacent areas having the dimensions of 103 µm×118 µm in the antiglare surface S1 of the article 10, the average value of the arithmetic mean height Sa of the six areas is preferably 300 nm or less, further preferably 200 nm or less, and even further preferably 150 nm or less. When the average value of the arithmetic mean height Sa of the six areas is 300 nm or less, decreases in the resolution of the antiglare surface S1 of the article 10 are limited.

Figure 3:
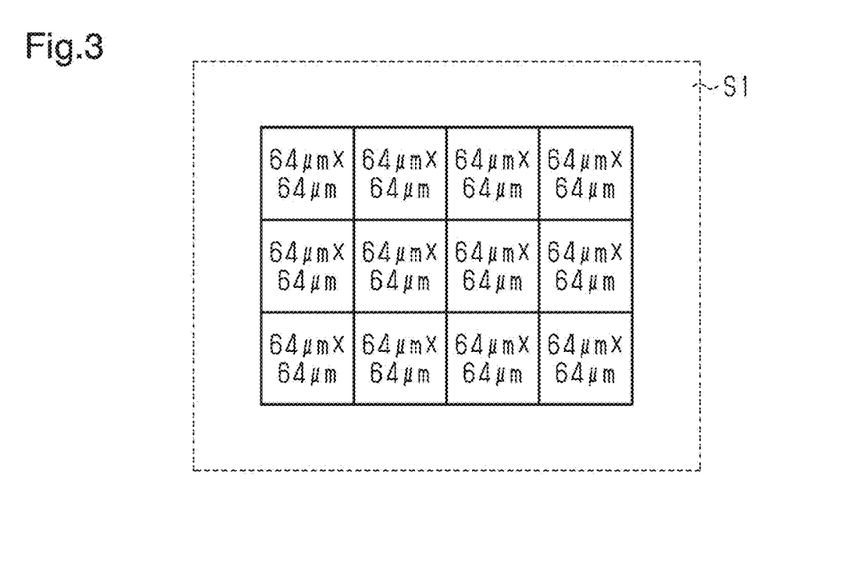
FIG. 3 is a diagram illustrating calculation of variation coefficient CV2.

In a case where the article 10 is light-transmissive, when measuring surface shapes of twelve adjacent areas obtained by dividing the antiglare surface S1 of the article 10 into dimensions of 64 µm×64 µm as shown in FIG. 3, the average value of the arithmetic mean height Sa of the twelve areas is preferably 20 nm or greater, further preferably 40 nm or greater, and even further preferably 60 nm or greater.

In a case where the article 10 is light-transmissive, when measuring the surface shapes of the twelve areas having the dimensions of 64 µm×64 µm in the antiglare surface S1, it is preferred that the surface shape of the antiglare surface S1 of the article 10 be such that variation coefficient CV2, which is obtained from the average value and the standard deviation of the arithmetic mean height Sa of the twelve areas, is less than 0.090.

When the average value of the arithmetic mean height Sa of the twelve areas is 20 nm or greater and the variation coefficient CV2, which is obtained from the arithmetic mean height Sa of the twelve areas, is less than 0.090, sparkle (dazzle) is reduced. Further, decreases in the resolution are limited.

The antiglare surface S1 of the article 10 has a ratio of the variation coefficient CV1 to the variation coefficient CV2 (ratio=CV1/CV2) of preferably 0.200 or greater and further preferably 0.300 or greater.

Preferably, the light-transmissive article 10 has a sparkle value (S value) of 0.04 or less, further preferably 0.03 or less, and even further preferably 0.02 or less.

Preferably, the light-transmissive article 10 has a resolution of 0.4 or greater, further preferably 0.5 or greater, even further preferably 0.6 or greater, and even further preferably 0.7 or greater.

A method for manufacturing the article 10 will now be described.

The manufacturing method of the article 10 includes a lamination step of laminating the antiglare layer 12 on the base material 11. The lamination step includes a step of forming the antiglare layer 12 by applying and then drying a coating agent that includes a precursor of the antiglare layer 12 to the base material 11. In the lamination step, the step of forming the antiglare layer 12 may be repeated multiple times.

For formation of the antiglare layer 12, the coating agent on the base material 11 may be heated and dried or dried under a normal temperature. Preferably, the coating agent on the base material 11 is dried for, for example, thirty seconds or longer.

The coating agent may be applied by a known wet-coating method. Examples of the wet-coating method include, for example, spray coating, spin coating, dip coating, dye coating, curtain coating, screen coating, inkjet coating, flow coating, gravure coating, bar coating, flexo coating, slit coating, and roll coating. Spray coating is preferred among these methods because the unevenness on the antiglare surface S1 can be easily adjusted.

The spray coating of the coating agent may be performed with a nozzle such as a known two-fluid nozzle or a known single-fluid nozzle. Preferably, droplets of the coating agent sprayed from the nozzle have a diameter of, for example, 0.1 to 100 µm in a volume-based median diameter (Dv50). The diameter of the droplets can be adjusted by, for example, varying the type of the nozzle, amount of air used, or amount of liquid.

As illustrated by examples described later, the variation coefficient CV1 and the variation coefficient CV2 of the antiglare surface S1 of the article 10 can be set by, for example, selecting ambient temperature, ambient humidity, or amount of air used in the spray coating.

For example, the variation coefficient CV1 can be increased by increasing the ambient humidity of the spray coating. Preferably, the ambient humidity of the spray coating exceeds 50%.

Also, for example, the variation coefficient CV2 can be decreased by increasing the amount of air used in the two-fluid nozzle. In particular, it is preferred that the amount of air used be increased by using a two-fluid spray nozzle with a multi-hole cap that includes multiple air supply ports.

Examples of the precursor contained in the coating agent include an inorganic precursor, such as a silica precursor, an alumina precursor, a zirconia precursor, or a titania precursor. Preferably, the precursor includes a silica precursor to facilitate control of reactivity. Examples of the silica precursor include, for example, a silane compound including a hydrolyzable group and a hydrocarbon group bound to a silicon atom, a hydrolytic condensate of a silane compound, and a silazane compound. Preferably, the silica precursor includes at least one of a silane compound and a hydrolytic condensate of a silane compound for limiting formation of a crank in the antiglare layer 12.

A silane compound includes a hydrocarbon group bound to a silicon atom and a hydrolyzable group. A hydrocarbon group may include one of or a combination of two or more groups selected from —O—, —S—, —CO—, and —NR— (R' is a hydrogen atom or univalent hydrocarbon group) between carbon atoms.

A hydrocarbon group may be a univalent hydrocarbon group bound to one silicon atom or a divalent hydrocarbon group bound to two silicon atoms. Examples of the univalent hydrocarbon group include an alkyl group, an alkenyl group, and an aryl group. Examples of the divalent hydrocarbon group include an alkylene group, an alkenylene group, and an arylene group.

Examples of the hydrolyzable group include an alkoxy group, an acyloxy group, a ketoxime group, an alkenyloxy group, an amino group, an aminooxy group, an amido group, an isocyanate group, and a halogen atom. An alkoxy group, an isocyanate group, and a halogen atom (particularly, chlorine atom) are preferred since they are well-balanced in terms of stabilizing a silane compound and facilitating hydrolysis of a silane compound. As an alkoxy group, an alkoxy group with 1 to 3 carbons is preferred, and a methoxy group or an ethoxy group is further preferred.

Examples of the silane compound include an alkoxysilane (such as tetramethoxysilane, tetraethoxysilane, or tetraisopropoxysilane), an alkoxysilane including an alkyl group (such as methyltrimethoxysilane or ethyltrimethoxysilane), an alkoxysilane including a vinyl group (such as vinyltrimethoxysilane or vinyltriethoxysilane), an alkoxysilane including an epoxy group (such as 2-(3,4-epoxycyclohexyl) ethyltrimethoxysilane, 3-glycidoxypropyltrimethoxysilane, 3-glycidoxypropylmethyldiethoxysilane, or 3-glycidoxypropyltriethoxysilane), and an alkoxysilane including an acryloyloxy group (such as 3-acryloyloxypropyltrimethoxysilane). Among these silane compounds, the use of at least one of or both of an alkoxysilane and a hydrolytic condensate of an alkoxysilane is preferred, and the use of a hydrolytic condensate of an alkoxysilane is further preferred.

A silazane compound is a compound including bonded silicon and nitrogen (—SiN—). A silazane compound may be a low-molecular compound or a high-molecular compound (polymer having predetermined repeating unit). Examples of the low-molecular silazane compound include hexamethyldisilazane, hexaphenyldisilazane, dimethylaminotrimethylsilane, trisilazane, cyclotrisilazane, and 1,1,3,3,5,5-hexamethylcyclotrisilazane.

Examples of the alumina precursor include an aluminum alkoxide, a hydrolytic condensate of an aluminum alkoxide, a water-soluble aluminum salt, and an aluminum chelate. Examples of the zirconia precursor include a zirconium alkoxide and a hydrolytic condensate of a zirconium alkoxide. Examples of the titania precursor include a titanium alkoxide and a hydrolytic condensate of a titanium alkoxide.

The liquid medium contained in the coating agent is a solvent selected in accordance with a type of the precursor and dissolves the precursor. Examples of the liquid medium include, for example, water, an alcohol, a ketone, an ether, a cellosolve, an ester, a glycol ether, a nitrogen-containing compound, and a sulfur-containing compound.

Examples of the alcohol include methanol, ethanol, isopropyl alcohol, butanol, and diacetone alcohol. Examples of the ketone include acetone, methyl ethyl ketone, and methyl isobutyl ketone. Examples of the ether include tetrahydrofuran and 1,4-dioxane. Examples of the cellosolve include methyl cellosolve and ethyl cellosolve. Examples of the ester include methyl acetate and ester acetone. Examples of the glycol ether include ethylene glycol monoalkyl ether. Examples of the nitrogen-containing compound include N, N-dimethylacetamide, N, N-dimethylformamide, and N-methylpyrrolidone. Examples of the sulfur-containing compound include dimethyl sulfoxide. The liquid medium may be of a single type or a combination of two or more types.

The liquid medium is preferably a liquid medium including water, that is, water, or a liquid mixture of water and another liquid medium. The other liquid medium is preferably an alcohol, and in particular preferably a methanol, an ethanol, an isopropyl alcohol, or a butanol.

Further, the coating agent may include an acid catalyst that prompts hydrolysis and condensation of a matrix precursor. An acid catalyst is a component that prompts hydrolysis and condensation of a matrix precursor and forms the antiglare layer 12 promptly. An acid catalyst may be added for hydrolysis and condensation of a raw material (such as alkoxysilane) during the preparation of solution of a matrix precursor before the preparation of the coating agent, or, may be added after the preparation of essential components. Examples of the acid catalyst include an inorganic acid (such as nitric acid, sulfuric acid, or hydrochloric acid) and an organic acid (such as formic acid, oxalic acid, acetic acid, monochloroacetic acid, dichloroacetic acid, or trichloroacetic acid).

Operation and advantages of the present embodiment will now be described.

(1) When dividing the antiglare surface S1 into six adjacent areas having the dimensions of 103 μm×118 μm to measure the surface shape, the antiglare surface S1 of the article 10 is such that the average value of the arithmetic mean height Sa of the six areas is 20 nm or greater. When measuring the surface shapes of the six adjacent areas having the dimensions of 103 μm×118 μm in the antiglare surface S1, the surface shape of the antiglare surface S1 is such that variation coefficient CV1, which is obtained from the average value and the standard deviation of the arithmetic mean height Sa of the six area, is 0.020 or greater.

This configuration limits specular reflection of light on the antiglare surface S1 thereby reducing background reflection on the antiglare surface S1. Consequently, the antiglare performance is improved.

(2) In a case where the article 10 is light-transmissive, when dividing the antiglare surface S1 into twelve adjacent areas having the dimensions of 64 μm×64 μm to measure the surface shape, it is preferred that the antiglare surface S1 of the article 10 be such that the average value of the arithmetic mean height Sa of the twelve areas is 20 nm or greater. In a case where the article 10 is light-transmissive, when measuring the surface shapes of the twelve areas having the dimensions of 64 μm×64 μm in the antiglare surface S1, it is preferred that the surface shape of the antiglare surface S1 be such that variation coefficient CV2, which is obtained from the average value and the standard deviation of the arithmetic mean height Sa of the twelve areas, is less than 0.090.

In this case, decreases are avoided in the resolution of an image that is transmitted through the article 10 and visually recognized. Therefore, the article 10 is optimal for an application arranged to transmit images displayed by a display device.

Modified Examples

The present embodiment may be modified as follows.
  The antiglare surface S1 may have a configuration other than the antiglare layer 12. For example, the antiglare surface S1 may be directly formed on the base material 11 by blasting or etching the base material 11.
  The article 10 may have both of the two main surfaces formed by the antiglare surface S1.

An intermediate layer such as a colored layer may be arranged between the base material 11 and the antiglare layer 12.

The article 10 may further include a functional layer such as an antireflection layer or an antifouling layer. A functional layer may be arranged between the base material 11 and the antiglare layer 12 or on the antiglare surface S1. For example, when an antireflection layer is arranged on the antiglare layer 12, background reflection on the antiglare surface S1 of the article 10 is further reduced. An antireflection layer can be configured by a known low reflection film having a refractive index that is lower than that of the base material or by a known dielectric multilayer film including high refractive index films and low refractive index films. An antifouling layer may further be arranged on the antireflection layer. An antifouling layer may be formed from a silane compound including a fluorine group.

Only an antireflection layer may be arranged on the antiglare surface S1 or only an antifouling layer may be arranged on the antiglare surface S1.

The light-transmissive article 10 may be coupled in advance to a display device. Alternatively, for example, the light-transmissive article 10 may be configured as a sheet member that is adhered to a display surface of a display device by an adhesive layer arranged on the main surface of the base material 11 at the side opposite to the antiglare layer 12.

Experimental Examples

Experimental examples will now be described.

As indicated in Table 1 shown below, samples of experimental examples 1 to 9 including antiglare surfaces of different surface shapes were prepared.

<Surface Shape Measurement>

The arithmetic mean height Sa was measured for each sample in accordance with ISO 25178 as one index of the surface shape of the antiglare surface.

Specifically, roughness data of the antiglare surface of each sample was obtained with a scanning white-light interference microscope (manufactured by Ryoka Systems Inc., VertScan). The scanning white-light interference microscope was set to a WAVE mode and used an objective lens with a 530 white filter and 20× magnification ratio under a condition of a measurement area of 316.77 μm×237.72 μm and a resolution of 640 pixels×480 pixels. A primary surface correction was performed on the roughness data using an analysis software (VS-Viewer).

Subsequently, a measurement region of 316.77 μm×237.72 μm was divided into six adjacent areas having the dimensions of 103 μm×118 μm to obtain the average value and the standard deviation of the arithmetic mean height Sa as a first surface shape. The standard deviation was divided by the average value to obtain the variation coefficient CV1.

In the same manner as described above, the measurement region of 316.77 μm×237.72 μm was divided into twelve adjacent area having the dimensions of 64 μm×64 μm to obtain the average value and the standard deviation of the arithmetic mean height Sa as second surface shape. The standard deviation was divided by the average value to obtain the variation coefficient CV2.

The first and second surface shapes of the antiglare surface of each sample were measured after forming a gold thin film on the antiglare surface of the sample by performing a sputtering process to increase the optical reflectivity. As long as the gold thin film arranged on the antiglare surface has a thickness of approximately a few nanometers, the gold thin film will directly trace the shape of the underlying unevenness. Thus, the effects on the measurement values of the arithmetic mean height Sa can be ignored.

In Table 1, the unit of the values in the columns of "Sa Average Value" and "Sa Standard Deviation" is nm.

TABLE 1

|  | 1st Surface Shape (103 μm × 118 μm) | | | 2nd Surface Shape (64 μm × 64 μm) | | | |
| --- | --- | --- | --- | --- | --- | --- | --- |
|  | Sa Average Value | Sa Standard Deviation | Variation Coefficient CV1 | Sa Average Value | Sa Standard Deviation | Variation Coefficient CV2 | Ratio of Variation Coefficient (CV1/CV2) |
| Experimental Example 1 | 82.9 | 3.0 | 0.036 | 83.3 | 3.4 | 0.040 | 0.900 |
| Experimental Example 2 | 88.7 | 4.3 | 0.048 | 88.9 | 4.8 | 0.054 | 0.889 |
| Experimental Example 3 | 75.5 | 3.1 | 0.041 | 72.8 | 4.3 | 0.059 | 0.695 |
| Experimental Example 4 | 98.7 | 3.9 | 0.040 | 100.3 | 6.7 | 0.067 | 0.597 |
| Experimental Example 5 | 125.2 | 5.8 | 0.047 | 125.0 | 8.4 | 0.067 | 0.701 |
| Experimental Example 6 | 131.3 | 4.9 | 0.037 | 130.6 | 10.2 | 0.078 | 0.474 |
| Experimental Example 7 | 139.9 | 3.3 | 0.024 | 139.4 | 9.6 | 0.069 | 0.348 |
| Experimental Example 8 | 138.8 | 3.5 | 0.025 | 137.9 | 12.3 | 0.090 | 0.278 |
| Experimental Example 9 | 75.1 | 1.1 | 0.015 | 75.0 | 3.8 | 0.051 | 0.294 |

When preparing the samples, a glass base material (chemically reinforced glass with thickness of 1.3 mm, T2X-1, manufactured by Nippon Electric Glass Co., Ltd.) was used as the base material (base plate). One main surface of the base material was spray-coated with a coating agent and dried to form the antiglare layer on the base material. As the coating agent, a solution (precursor concentration: 3% by mass) was used in which a precursor of the antiglare layer (tetraethyl orthosilicate) was dissolved in a liquid medium containing water. The spray coating apparatus used was equipped with a two-fluid spray gun including a multi-hole cap.

Table 2 indicates the conditions for forming the antiglare layer on the sample of each experimental example through a spray coating process in detail.

TABLE 2

|  | Temperature [° C.] | Humidity [%] | Amount of Air Used [L/min] | Liquid Flow Rate [mL/min] | Applied Amount [mL/m$^2$] |
|---|---|---|---|---|---|
| Experimental Example 1 | 18 | 60 | 205 | 7 | 60 |
| Experimental Example 2 | 18 | 60 | 195 | 7 | 60 |
| Experimental Example 3 | 19 | 60 | 195 | 7 | 60 |
| Experimental Example 4 | 18 | 60 | 190 | 7 | 60 |
| Experimental Example 5 | 18 | 60 | 175 | 7 | 60 |
| Experimental Example 6 | 18 | 60 | 165 | 7 | 60 |
| Experimental Example 7 | 18 | 60 | 195 | 5 | 114 |
| Experimental Example 8 | 18 | 60 | 160 | 7 | 60 |
| Experimental Example 9 | 18 | 50 | 195 | 7 | 80 |

In Table 2, "Temperature" indicates the ambient temperature of the spray coating, and "Humidity" indicates the ambient humidity of the spray coating. In Table 2, "Amount of Air Used" indicates the amount of air used by the two-fluid spray gun with the multi-hole cap, and "Liquid Flow Rate" indicates the flow rate of the coating agent sprayed from the spray gun. In Table 2, "Applied Amount" indicates the amount of the coating agent applied (prior to drying). Further, the volume-based median diameter (Dv50) of the sprayed droplets was measured under the conditions of experimental examples 1, 5, and 8 to be 2.6 μm, 3.0 μm, and 3.3 μm, respectively. The median diameter was measured with a laser diffraction type particle size distribution measurement apparatus (Spraytec, manufactured by Malvern).

The base materials were spray-coated with the coating agent under the conditions indicated in Table 2. Then, the base materials with a coating layer were fired at 180° C. for thirty minutes to obtain the samples of the experimental examples.

The following optical characteristics were measured for the sample of each experimental example.

<Specular Reflection Peak Value (Rspec)>

The specular reflection peak value (Rspec) indicates the degree of background reflection on the antiglare surface and decreases as background reflection on the antiglare surface decreases.

The specular reflection peak value of each sample was measured with a glossmeter (Rhopoint IQ, manufactured by Konica Minolta). The measured specular reflection peak value was calculated from a gloss value at a reflection angle of 20±0.1° when an incident angle of light was 20°. For measurement of the specular reflection peak value, reflection on a rear surface of each sample was removed.

The specular reflection peak value of the sample of each experimental example is indicated in the column of "Rspec" in Table 3.

<Sparkle Value>

A sparkle value indicates the degree of sparkle (dazzle resulting from sparkle effect) on the antiglare surface and decreases as the sparkle on the antiglare surface decreases. Thus, the sparkle value allows for a quantitative evaluation of sparkle that is close to image recognition based on human visual perception.

The sparkle value of each sample was measured with SMS-1000 (manufactured by Display-Messtechnik & Systeme) under the following measurement condition.

Figure 4:
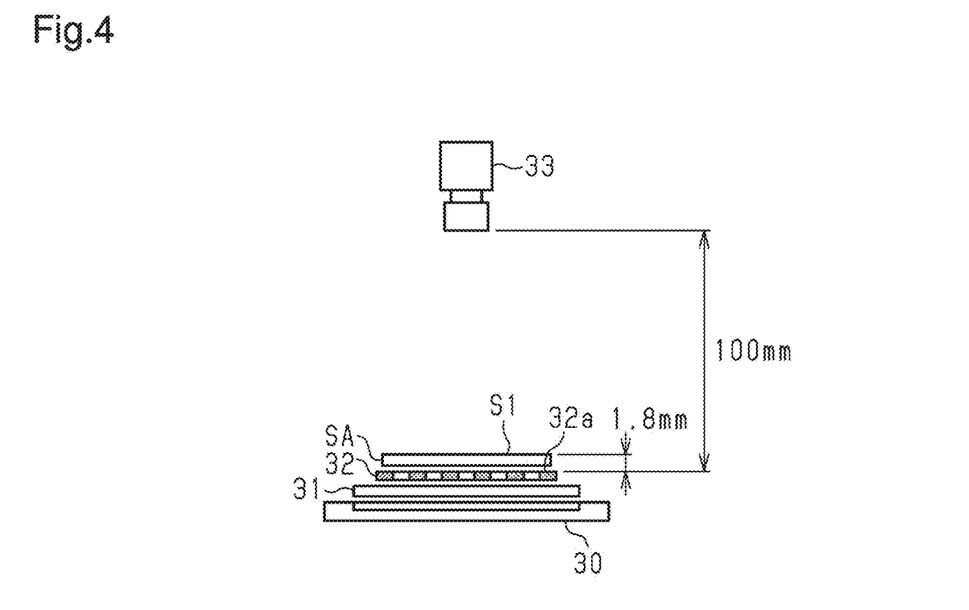
FIG. 4 is a diagram illustrating how a sparkle value is measured.

Focal range of lens: 100 mm
Aperture radius of lens: 4.5 mm
Pattern mask: 326 ppi For measurement, as shown in FIG. 4, a color filter 31 (transparent wavelength of around 510 nm) and a pattern mask 32 were placed in this order on a planar light source 30, and sample SA was placed on the pattern mask 32 so that the surface at the side opposite to the antiglare surface S1 was faced toward the pattern mask 32. Sample SA was located at a position at which the distance from a top surface 32a of the pattern mask 32 to the antiglare surface S1 was 1.8 mm.

Then, a picture of sample SA was taken with a light detector 33 to obtain image data of the antiglare surface S1 of sample SA. Based on the obtained image data, pixel brightness of each pixel of the pattern mask 32, the standard deviation of the pixel brightness between pixels, and the average value of the pixel brightness were obtained. The obtained standard deviation of the pixel brightness between pixels and the average value of the pixel brightness were substituted into the following equation (1) to calculate the sparkle value.

$$\text{Sparkle value} = (\text{standard deviation of pixel brightness of pattern mask})/(\text{average value of pixel brightness of pattern mask}) \quad (1)$$

The sparkle value of sample SA of each experimental example is indicated in the column of "S Value" in Table 3.

<Resolution>

In the same manner as the above-described measurement of the sparkle value, image data of the antiglare surface S1 of sample SA was obtained. The resolution was obtained from a modulation transfer of a clarity value of the obtained image data using SMS-1000 in DOI mode (software "Sparkle measurement system").

The resolution is obtained from following equations (2) and (3).

$$MT = (Ip - Iv)/(Ip + Iv) \quad (2)$$

Here, "Ip" and "Iv" respectively indicate a peak value and a valley value of the brightness.

$$\text{Resolution} = MT \text{ (sample)}/MT \text{ (blank)} \quad (3)$$

Here, "MT (sample)" is a MT value when sample SA was placed on the pattern mask 32, and "MT (blank)" is a MT value when nothing was placed on the pattern mask 32.

The resolution of sample SA of each experimental example is indicated in the column of "Resolution" in Table 3.

TABLE 3

|  | Rspec | S Value | Resolution |
|---|---|---|---|
| Experimental Example 1 | 1.3 | 0.015 | 0.73 |
| Experimental Example 2 | 1.2 | 0.016 | 0.73 |
| Experimental Example 3 | 1.8 | 0.014 | 0.77 |
| Experimental Example 4 | 1.1 | 0.016 | 0.67 |

TABLE 3-continued

|  | Rspec | S Value | Resolution |
|---|---|---|---|
| Experimental Example 5 | 1.2 | 0.022 | 0.53 |
| Experimental Example 6 | 1.2 | 0.029 | 0.52 |
| Experimental Example 7 | 1.0 | 0.026 | 0.57 |
| Experimental Example 8 | 1.5 | 0.036 | 0.43 |
| Experimental Example 9 | 3.3 | 0.011 | 0.75 |

<Results>

(1) The specular reflection peak values (Rspec) of the samples of experimental examples 1 to 8 are smaller than the specular reflection peak value (Rspec) of the sample of experimental example 9. Accordingly, background reflection on the antiglare surface is more reduced in the samples of experimental examples 1 to 8 than the sample of experimental example 9.

(2) The sparkle values (S values) of the samples of experimental examples 1 to 7 are smaller than the sparkle value (S value) of the sample of experimental example 8. Accordingly, sparkle (dazzle) is more limited in the samples of experimental examples 1 to 7 than the sample of experimental example 8.

Also, the resolutions of the samples of experimental examples 1 to 7 are higher than that of the sample of experimental example 8. Accordingly, decreases in the resolution is more limited in the samples of experimental examples 1 to 7 than the sample of experimental example 8.

Application Examples

Application examples that laminate other functional layers on the antiglare surface will now be described.

As indicated in Table 4, two samples including antiglare surfaces of different surface shapes were prepared. Then, an antireflection layer was arranged on the antiglare layer of each sample and an antifouling layer was further arranged on the antireflection layer to form samples of application examples 1 and 2. In the same manner as the examples described above, coating layer-including base materials, which were obtained by spray coating the base materials with a coating agent under the conditions indicated in Table 5, underwent firing at 180° C. for thirty minutes to prepare the antiglare layers of the samples of application examples 1 and 2.

The antireflection layer was configured by a dielectric multilayer film that was formed by reactive sputtering. The dielectric multilayer film was formed by four layers arranged in the order of a high refractive index film (niobium oxide, thickness of 15 nm), a low refractive index film (silicon oxide, thickness of 30 nm), a high refractive index film (niobium oxide, thickness of 110 nm), and a low refractive index film (silicon oxide, thickness of 80 nm) from the base material.

The antifouling layer was configured by an antifouling film that was formed by applying a fluorine-containing organosilicon compound solution (UF503, manufactured by DAIKIN INDUSTRIES) and firing the applied layer at 150° C. for sixty minutes.

The measurement results of the optical characteristics of the sample of each application example are indicated in Table 6.

TABLE 4

| | 1st Surface Shape (103 μm × 118 μm) | | | 2nd Surface Shape (64 μm × 64 μm) | | | |
|---|---|---|---|---|---|---|---|
| | Sa Average Value | Sa Standard Deviation | Variation Coefficient CV1 | Sa Average Value | Sa Standard Deviation | Variation Coefficient CV2 | Ratio of Variation Coefficient (CV1/CV2) |
| Application Example 1 | 116.3 | 4.5 | 0.039 | 113.0 | 8.2 | 0.072 | 0.542 |
| Application Example 2 | 111.3 | 3.0 | 0.027 | 112.9 | 6.9 | 0.061 | 0.443 |

TABLE 5

| | Temperature [° C.] | Humidity [%] | Amount of Air Used [L/min] | Liquid Flow Rate [mL/min] | Applied Amount [mL/m$^2$] |
|---|---|---|---|---|---|
| Application Example 1 | 18 | 60 | 195 | 5 | 92 |
| Application Example 2 | 18 | 60 | 195 | 5 | 76 |

TABLE 6

| | Rspec | S Value | Resolution |
|---|---|---|---|
| Application Example 1 | 0.3 | 0.023 | 0.63 |
| Application Example 2 | 0.5 | 0.019 | 0.71 |

The above-described application examples allow the antireflection layer and the antifouling layer to be arranged on the antiglare layer.

Effects of Antireflection Layer and Antifouling Layer on Antiglare Surface

Next, the effects of the antireflection layer and the antifouling layer on the optical performances based on the antiglare surface were evaluated.

Multiple samples A each including the antiglare surface (antiglare layer) with different optical characteristics (surface irregularities) were prepared in the same manner as the above-described experimental examples, and samples B were produced by arranging the antireflection layer and the antifouling layer on each sample A in the same manner as the application examples. The relationship between the optical characteristics of samples A and the optical characteristics of samples B is shown in the graphs of FIGS. 5 to 7.

Figure 5:
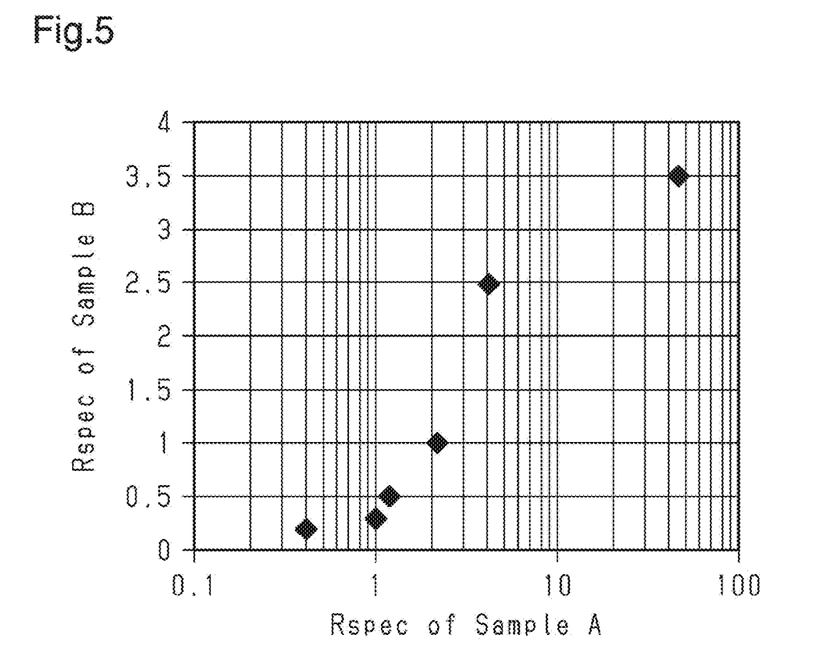
FIG. 5 is a graph showing the relationship between a specular reflection peak value (Rspec) of sample A and a specular reflection peak value (Rspec) of sample B.

FIG. 5 is a graph showing the relationship between the specular reflection peak values (Rspec) of samples A, which include only the antiglare layer on the base material, and the specular reflection peak values (Rspec) of samples B, which include the antiglare layer, the antireflection layer, and the antifouling layer on the base material.

The graph shown in FIG. 5 reveals that a decrease in the background reflection on the antiglare surface of samples A decreases the background reflection on the antiglare surface of samples B.

Figure 6:
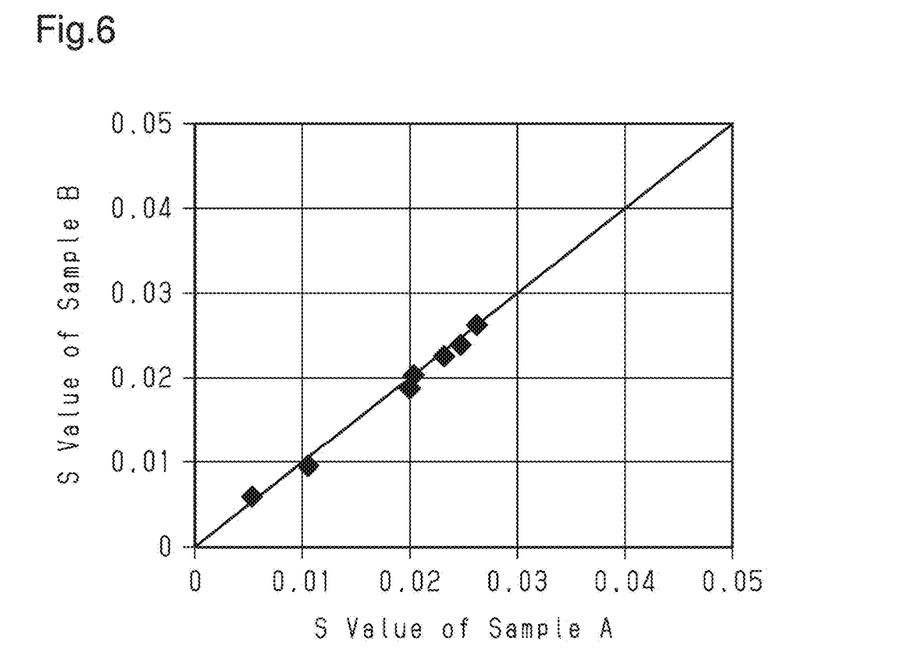
FIG. 6 is a graph showing the relationship between a sparkle value (S value) of sample A and a sparkle value (S value) of sample B.
Figure 7:
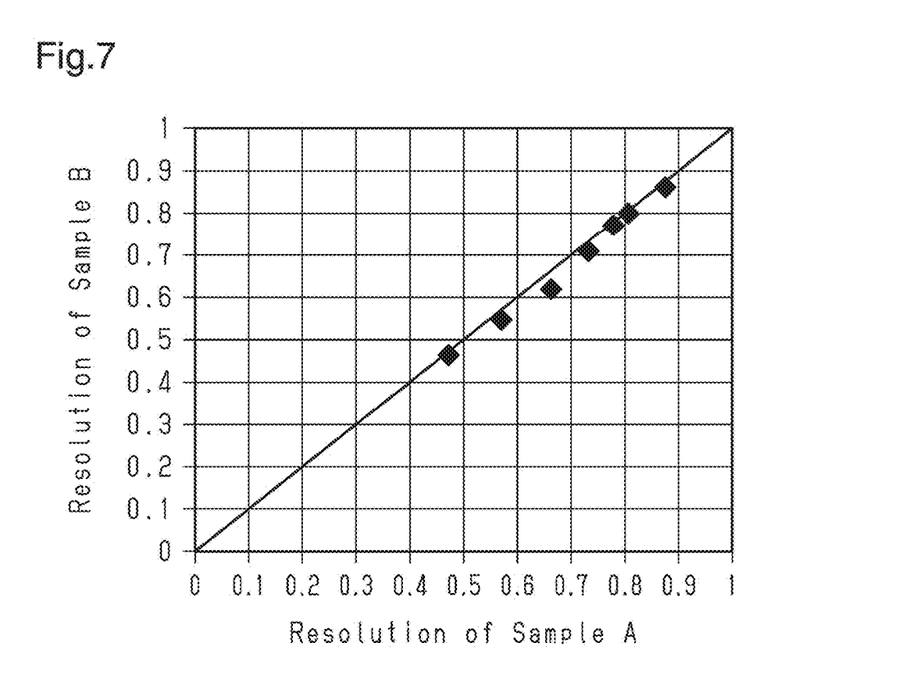
FIG. 7 is a graph showing the relationship between a resolution of sample A and a resolution of sample B.

FIG. 6 is a graph showing the relationship between the sparkle values (S values) of samples A, which include only the antiglare layer on the base material, and the sparkle values (S values) of samples B, which include the antiglare layer, the antireflection layer, and the antifouling layer on the base material.

The graph shown in FIG. 6 reveals that the antireflection layer and the antifouling layer have almost no effect on the sparkle values (dazzle) measured in samples A.

FIG. 7 is a graph showing the relationship between the resolutions of samples A, which include only the antiglare layer on the base material, and the resolutions of samples B, which include the antiglare layer, the antireflection layer, and the antifouling layer on the base material.

The graph shown in FIG. 7 reveals that the antireflection layer and the antifouling layer have almost no effect on the resolutions of samples A.

From the above results, it can be understood that even when the antireflection layer and the antifouling layer are further arranged on the antiglare surface, optical performances based on the antiglare surface can be obtained.

DESCRIPTION OF REFERENCE NUMERALS 10) article, 11) base material, 12) antiglare layer, S1) antiglare surface.

We claim:

1. An article comprising an antiglare surface including six adjacent first areas, each first area having a dimension of 103 µm×118 µm and a corresponding surface shape having an arithmetic mean height Sa,
   wherein an average value of the arithmetic mean heights Sa of the six first areas is 20 nm or greater and a variation coefficient CV1, based on the average value and a standard deviation of the arithmetic mean heights Sa of the six first areas, is 0.020 or greater.

2. The article according to claim 1, further including twelve adjacent second areas, each second area having a dimension of 64 µm×64 µm and a corresponding surface shape having an arithmetic mean height Sa,
   wherein the article is light-transmissive, and an average value of the arithmetic mean heights Sa of the twelve second areas is 20 nm or greater and a variation coefficient CV2, based on the average value and a standard deviation of the arithmetic mean heights Sa of the twelve second areas, is less than 0.090.

3. The article according to claim 2, wherein a ratio of the variation coefficient CV1 to the variation coefficient CV2 (ratio=CV1/CV2) is 0.200 or greater.

4. The article according to claim 1, comprising:
   a glass base material; and
   an antiglare layer arranged on the glass base material.

5. The article according to claim 1, further comprising an antireflection layer arranged on the antiglare surface.

6. The article according to claim 5, further comprising an antifouling layer arranged on the antireflection layer.

* * * * *